United States Patent [19]

James

[11] Patent Number: 4,665,763
[45] Date of Patent: May 19, 1987

[54] WORM GEAR DRIVE

[76] Inventor: Winthrop James, Huntersfield Rd., Rte. ≯11, Box 121, Prattsville, N.Y. 12468

[21] Appl. No.: 830,849

[22] Filed: Feb. 14, 1986

[51] Int. Cl.$^4$ .................. F16H 1/16; F16H 55/17
[52] U.S. Cl. ........................... 74/425; 74/458; 74/465
[58] Field of Search ............... 74/425, 458, 465, 464; 384/49

[56] References Cited

U.S. PATENT DOCUMENTS

| 507,681 | 10/1893 | Hoyt | 74/464 |
|---|---|---|---|
| 598,629 | 2/1898 | Higgins | 74/465 |
| 874,342 | 12/1907 | Janson | 74/465 |
| 1,580,055 | 4/1926 | Lax | 74/464 |
| 2,278,880 | 4/1942 | Ivy | 74/465 |
| 2,714,315 | 8/1955 | Reader et al. | 74/465 |
| 3,820,413 | 6/1974 | Brackett | 74/465 |
| 3,875,817 | 4/1975 | Mayfield | 74/465 |
| 4,541,297 | 9/1985 | Fujita | 74/465 |

FOREIGN PATENT DOCUMENTS 2115902 9/1983 United Kingdom .................. 74/425

Primary Examiner—Cornelius J. Husar
Assistant Examiner—Peter M. Cuomo
Attorney, Agent, or Firm—Charles J. Brown

[57] ABSTRACT

A worm gear drive wherein revolvable spheres captured in respective cages are equally spaced about a wheel rim with their centers on a common circle to mesh with a worm groove by rolling only on a track defined by a sidewall of that groove without sliding engagement, the track following a variable diameter hour-glass locus corresponding to an arucate locus of a radius equal to that of the common circle.

7 Claims, 5 Drawing Figures

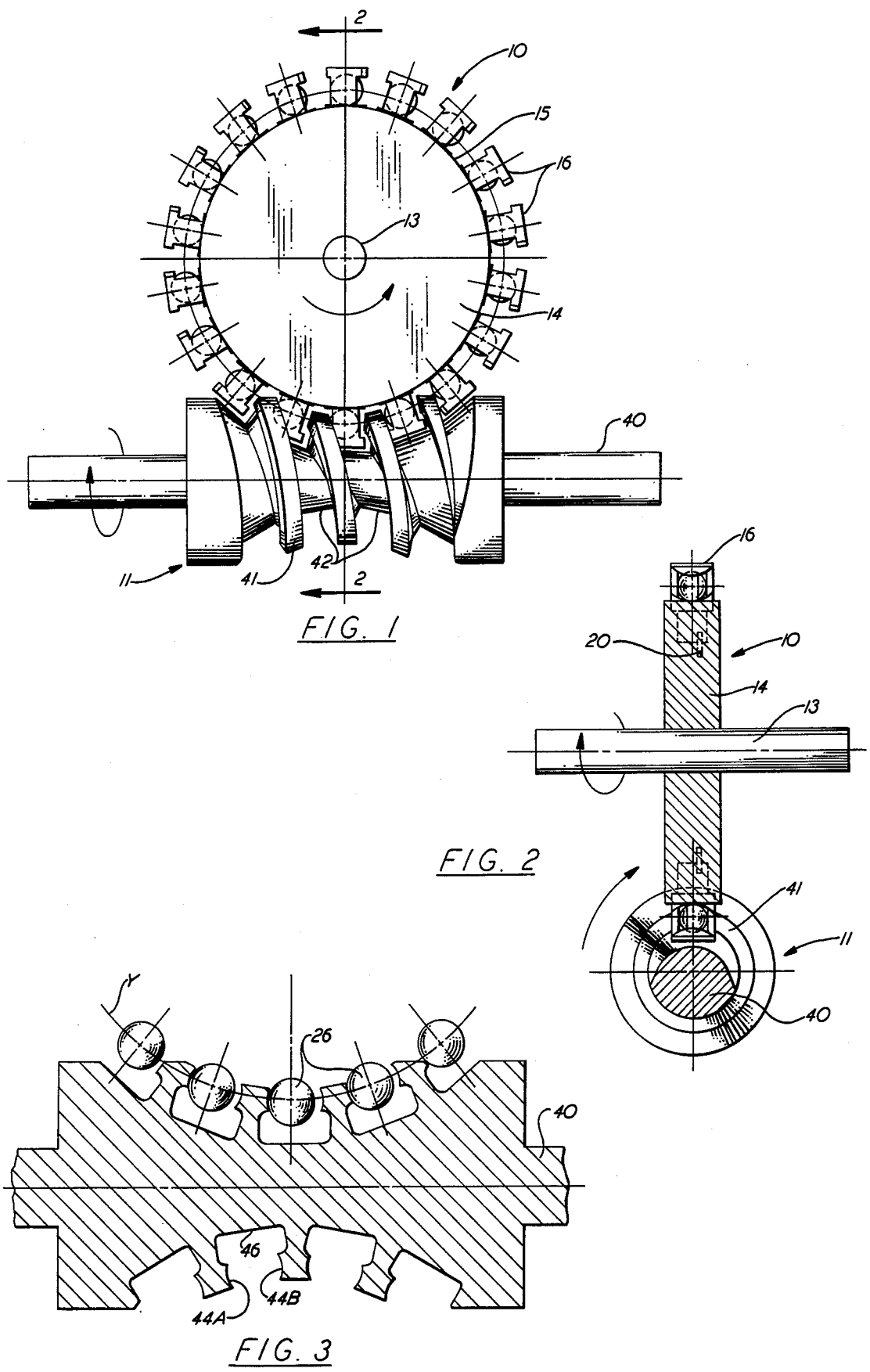

WORM GEAR DRIVE

BACKGROUND OF THE INVENTION

Worm gear drives are widely employed to transmit power at high velocity ratios between shafts which do not intersect and which are usually at right angles. Such drives may be used as speed increasers but their usual use is as speed reducers in which the worm is the driver and the wheel is the driven member. Single-threaded or double-threaded worms are available and usually they are of straight cylindrical form. It is known however to configure a worm along a variable diameter locus corresponding to an arcuate locus of a radius equal to that of the pitch circle of the wheel with which it meshes, a so-called hour-glass worm.

It is always the case with worm wheel drives employing wheels with ordinary teeth that there is measurable friction between the wheel teeth and the worm groove as the two mesh together. The side surface of the worm groove inevitably slides across the face of the wheel tooth as they pass in contact. To reduce this friction designs have been proposed wherein the teeth of the wheel are replaced by rotatable members such as conical spindles, as shown for example in U.S. Pat. Nos. 1,262,932 and 1,463,687. Such spindles or conical rollers substantially eliminate skidding across the side of the worm groove during meshing. However they always present the same circumferential zone of engagement to the worm and thus they tend to flatten through wear along that zone, thus introducing slight but measurable skidding between the edge portions of the flattened zone and the worm.

It has been proposed to replace spindles with spheres such as is taught in U.S. Pat. No. 3,274,847. In that design the spheres transfer from races on the wheel to be captured between the worm and the wheel while they are in meshed engagement and transmitting torque. However, even though the spheres roll in the helical worm groove, they nonetheless are in sliding engagement with the wheel race while doing work. Sliding friction is still not eliminated. Another disadvantage of that design is that the wheel cannot be disassembled from the worm without allowing some of the spheres to fall out of the assembly because in the meshing sector of the wheel the spheres float freely and require the worm and the wheel to be together in order to stay in place.

It is a principal purpose of the present invention to provide a worm gear drive wherein spheres are utilized in place of rigid gear teeth or conical spindles but in a manner such that the spheres mesh in a helical worm groove in rolling engagement along a sphere track without any sliding engagement between the wheel and the worm or between the spheres and their wheel. The spheres are intended to present infinitely variable equators to roll on the track so that they wear uniformly and do not flatten. It is an object of the invention to achieve this effect by a cage design for each sphere which permits the sphere to mesh and roll in the worm groove while rolling freely in the cage. An additional purpose of the invention is to achieve these objects while always retaining the spheres captured in their cages so that they do not fall free from the wheel when the worm and wheel are disassembled.

SUMMARY OF THE INVENTION

In its combination form the worm gear drive of the invention comprises a unitary wheel subassembly and a worm. The unitary wheel subassembly itself comprises an axially rotatable circular rim and radially outwardly extending cages attached in equal spacing about the rim. Respective spheres aare held in freely rotatable relation within the cages with their centers on a common circle. Anti-friction means are provided between each sphere and its cage. Each cage defines at least one aperture through which a face of the associated sphere projects on a certain axis skewed at a certain acute angle to the plane of the common circle.

The worm of the combination comprises an axially rotatable shaft. At least one helical land is formed about the shaft and defines at least one helical groove with a pitch lead angle equal to the certain acute angle and a depth and width sufficient to receive the individual spheres and cages. At least one side wall of the groove defines at least one sphere track following a variable diameter hour-glass locus corresponding to an arcuate locus of a radius equal to that of a common circle, which track is the only worm surface engaged by the wheel. The wheel subassembly is disposed with its rotation axis at right angles to that of the worm and with certain of the spheres meshed in the groove in rolling engagement along the sphere track without sliding engagement between the wheel and the worm.

The subcombination of the unitary wheel sub-assembly as described above is also provided by the invention. In addition the invention provides the combination of any unitary wheel sub-assembly with a peripheral array of equally spaced freely rotatable sphere faces having their respective centers thereof on a common circle, together with a worm as described above.

In its preferred form the anti-friction means in the unitary wheel sub-assembly comprises ball-bearing means between each sphere and its cage so that the spheres mesh and roll in the groove without sliding engagement between the spheres and their cages. Each such ball-bearing means preferably comprises a pair of circular coaxial ball-bearing arrays revolvable in respective planes parallel to the wheel rotation axis and on opposite sides of the associated sphere center. Inner and outer circular races are included for each ball-bearing array. Each inner race floats in closely spaced relation between the ball-bearing array and the sphere and each outer race is affixed to the cage. By this construction when the sphere rolls in the track it is forced back against the inner races to cause them to roll on the ball-bearing arrays.

The advantage of this structure and the modifications which may be made within the scope of the invention should be apparent from the following disclosure of a preferred form.

BRIEF DESCRIPTION OF THE DRAWINGS

FIG. 1 illustrates the worm gear drive of the invention viewing the worm in side elevation and the wheel axis on end;

FIG. 2 is a lateral section taken along the line 2—2 of FIG. 1;

FIG. 3 ia an enlarged fragmentary section taken longitudinally through the axis of the worm and showing only those spheres of the wheel which are approaching and in meshing engagement with the worm groove;

DESCRIPTION OF PREFERRED EMBODIMENT

Figure 4:
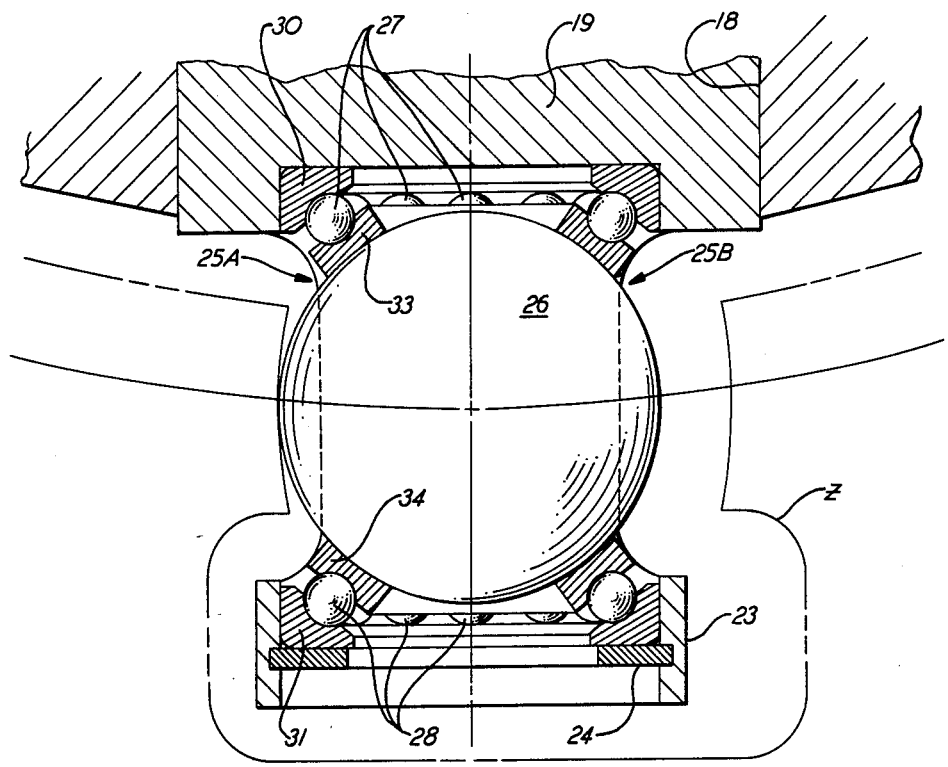
FIG. 4 is an enlarged fragmentary section showing one sphere and its associated cage.

In general the worm gear drive of the invention comprises a unitary wheel sub-assembly 10 and a worm 11, both of which are shown in full in FIGS. 1 and 2. The wheel sub-assembly 10 according to the invention can be used with any worm design though to best advantage with the worm of the invention, and it will be described first.

The wheel sub-assembly 10 includes a central rotatable shaft 13 which is suitably journaled in trunnions which are not shown. The wheel 10 is usually, though not always, the driven member of the worm gear drive. Affixed about the wheel shaft 13 is any form of disk 14, whether solid or spoked, which has an outer circular rim 15. In place of teeth a plurality of radially outwardly extending cages 16 are attached in equal spacing about the rim 15. Eighteen cages are shown on the wheel 10 in this embodiment though they can be of any reasonable number. A suggested method of attaching each cage 16 to the rim 15 of the wheel is shown most clearly in FIGS. 2 and 4. Stepped diameter radial seats 18 are formed in the rim 15 and each cage 16 includes a cylindrical base 19 of corresponding stepped diameter to be received snugly in the respective seat 18. A locating pin 20 between the cage base 19 and the wheel may be provided for each cage. Each cage base 19 may be removably affixed within its associated seat 18, as for example by a set screw (not shown) threaded through the edge portion of the circular face of the dish 14 into an appropriate side socket in the base 19.

Figure 5:
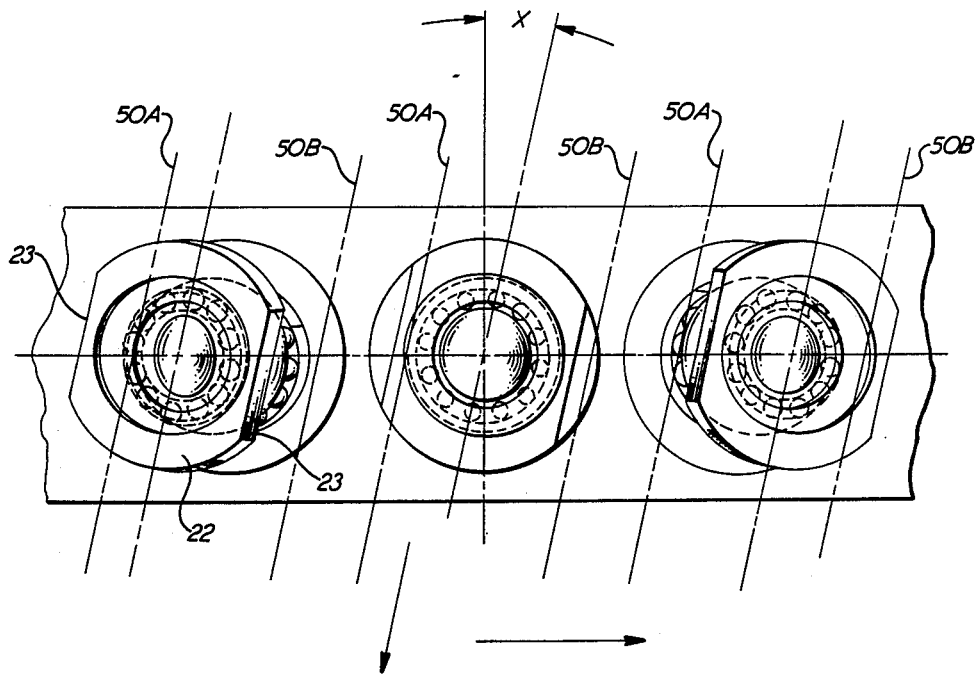
FIG. 5 is an enlarged fragmentary edge view of the wheel, as viewed upwardly at the lowermost three spheres and cages engaged with the worm.

FIGS. 4 and 5 best illustrate that portion of each cage 16 extending from the rim 15 of the wheel 10. A hollow cylindrical sleeve 22 extends radially outwardly from the cage base 19. At its outer end the sleeve 22 is formed with opposed flats 23 to to provide clearance within the worm groove as will be described below. A retaining ring 24 is appropriately affixed in the outermost end of the sleeve 22. Each cage sleeve 22 also defines opposed coaxial apertures 25A and 25B, the common axis of which is skewed at a certain acute angle to the axis of rotation of the shaft 13 as shown by the central cage 16 in FIG. 5. The acute angle is designated X in FIG. 5. This common axis is also skewed at the same acute angle X to the plane of what is referred to below as circle Y in FIG. 3.

Respective spheres 26 are permanently encaptured in freely rotatable relation within the respective cages 16 with their centers on the common circle designated Y. It will be seen that opposed faces of each sphere 26 project through the respective apertures 25A and 25B of the sleeve 22 of each cage 16 in position so that the sphere can be in rolling engagement with other surfaces in a manner described below, all as shown most clearly in FIG. 4. Anti-friction means are provided between each sphere 26 and the remainder of its associated cage 16, and such means are preferably of a ball-bearing type as shown in FIGS. 4 and 5. A pair of circular coaxial ball-bearing arrays are revolvable in respective planes parallel to the axis of the shaft 13 and equally spaced on opposite sides of the center of the associated sphere 26, namely a first ball-bearing array 27 and a second ball-bearing array 28. The first ball-bearing array 27 is inside the circle Y and the second ball-bearing array 28 is outside the circle Y. A first outer bearing race 30 is mounted on the cage base 19 as shown most clearly in FIG. 4 and a second outer bearing race 31 is mounted against the retaining ring 24 at the outer end of the sleeve 22 of the cage, all as shown most clearly in FIG. 4. A cylindrical groove is provided in each of the inner and outer races 30 and 31 facing at an angle disposed toward the center of the associated sphere 26. The ball-bearing arrays 27 and 28 roll in the respective outer races 30 and 31 which are affixed at all times relative to the wheel 10. A first inner bearing race 33 and a second inner bearing race 34 are also provided. The outside surface of each of the inner races 33 and 34 is formed with an apporpriate cylindrical groove to receive the ball-bearing arrays 27 and 28 in opposition to the similar grooves on the first and second outer races 30 and 31. The inner surface of each of the inner bearing races 33 and 34 is concave and spherical to correspond to the surface of the sphere 26. A definite slight clearance is provided between the sphere 26 and the inside concave surfaces of the inner races 33 and 34. Each of the inner races 33 and 34 can therefore be said to float in closely spaced relation between the associated ball-bearing array and the sphere 26.

By this construction it will be apparent that a given sphere 26 will not roll in relation to its associate cage 16 when as it is not in rolling engagement with any other surface but it will through inevitable vibration tend to revolve erratically with universal freedom of rotational movement to present an infinite variety of faces through the apertures 25A and 25B. If one of these presented faces of the sphere 26 engages and begins to roll in a plane substantially parallel to and between the planes of rotation of the ball-bearing arrays 27 and 28, then the rolling sphere 26 will be forced back against the inner races 33 and 34 to close the clearance mentioned above and cause those inner races 33 and 34 to begin rolling with it in the manner of wheels on the associated inner and outer ball-bearing arrays 27 and 28. By this construction it will be apparent that each sphere 26 may roll along its equator and when it does so it revolves freely on the ball-bearing arrays 27 and 28 without sliding friction with respect to its cage 16. When it is not so rolling it presents a new equator for the next rolling engagement so that it wears uniformly and maintains its sphericity. For purposes of illustrative sizes, a sphere 26 of three-eighths inch diameter may be associated with ball-bearings in the arrays 27 and 28 of 0.050 inch diameter.

The worm gear 11 of the invention will now be described. The invention contemplates that it may be in combination with any unitary wheel sub-assembly having a peripheral array of spaced freely rotatble sphere faces with respective centers thereof on a common circle as indicated in FIG. 3.

The worm 11 comprises an axially rotatable shaft 40 disposed at right angles to but not intersecting the shaft 13 of the wheel 10. At least one land 41 is formed about the shaft 40 of the worm 11. The land 41 defines a corresponding hour-glass groove 42 with a pitch lead angle equal to the acute angle X shown in FIG. 5. There may be double and even triple lands 41 and grooves 42 formed on the worm 11 to provide a multiple thread worm design, though the single thread form is most common and is shown in this embodiment. Each groove has a cross-section of a depth and width sufficient to receive the individual spheres 26 and cages 16. As shown in FIG. 3 one sidewall of the groove 42 defines one sphere track 44A and the opposite sidewall of the groove forms a second sphere track 44B. The remainder of the groove 42, namely the inner portion 46 thereof between the first and second sphere tracks 44A and 44B, can be of any configuration suitable for clearance with the spheres 26 and cages 16 and need not be formed to any particular tolerance. Hour-glass worm designs are known, a modification of which is shown in the aforementioned U.S. Pat. No. 3,274,847, wherein the rolling surface of the worm follows a variable diameter locus corresponding to an arcuate locus having a radius equal to that of the pitch diameter of the associated wheel. such a design is adapted to the present invention in that each of the sphere tracks 44A and 44B follows a variable diameter locus corresponding to an arcuate locus of the circle Y upon which the centers of the spheres 26 are disposed. Each of the sphere tracks 44A and 44B is also slightly concave though of a radius considerably greater than that of th spheres 26, as illustrated in FIG. 4 where the shape of the sphere track 44A is suggested by dot-dot-dash line Z (the track itself would no be visible in this view of the sphere in its lowermost position). These tracks 44A and 44B are the only surfaces of the worm 11 engaged by the wheel 10.

The first and second sphere tracks 44A and 44B are spaced apart as shown in FIG. 3 so that the cage may pass between them. It is the purpose of the flats 23 on the sleeve 22 of the cage to provide clearance for this purpose. Since the apertures 25A and 24B are skewed at the acute angle X shown in FIG. 5 with relation to the axis of rotation of the wheel 10, and since this angle X is equal to the pitch lead angle of the helical groove 42 of the worm, it follows that the faces of each sphere 26 projecting through those apertures 25A and 25B are properly disposed to roll along one or the other of the sphere tracks 44A and 44B. To assemble the wheel 10 on the worm 11 it may be necessary, depending on clearance, to remove a few of the cages 16 from their seats 18 and screw the worm into meshing engagement with the wheel. The removed cages would then be put back in place. This process would be reversed during disassembly. While the sphere tracks are not visible in FIG. 5, their eventual position with respect to the spheres and cages there shown is suggested by the dot-dot-dash lines 50A corresponding to the sphere track 44A and 50B corresponding to the sphere track 44B. In the position shown the spheres 26 are being engaged by the sphere track 44A and the opposite shpere track 44B is not in operation. Therefore, assuming the worm 11 is the driving member, its shaft 40 is rotating in the direction shown by the curved arrow in FIG. 1 and clockwise as shown by the arrow in FIG. 2, and the wheel 10 is rotating counterclockwise as shown by the arrow in FIG. 1 and by the curved arrow in FIG. 2. If the direction of drive of the worm 11 is reversed, the opposite sphere track 44B engages that face of each sphere 26 projecting through the respective aperture 25B of the cage 16 and the aforementioned directions are all opposite to that just described. If a unidirectional drive is intended it is not necessary to provide two sphere tracks such as 44A and 44B but only one, and the opossite surface where the other track would be could be roughly configured in a manner similar to the inner portion 46 of the groove.

The scope of the invention is to be determined by the following claims rather than the foregoing description of a preferred embodiment.

What is claimed is:
1. A worm gear drive comprising
   (a) an unitary wheel sub-assembly comprising
      i. an axially rotatable circular rim,
      ii. radially outwardly extending cages attached in equal spacing about the rim,
      iii. a plurality of spheres respectively held in freely rotatable relation within the cages with their centers on a common circle, and
      iv. anti-friction means between each sphere and its associated cage,
      v. each cage defining at least one aperture through which a face of the associated sphere projects on an axis skewed at an acute angle to a plane of said common circle; and
   (b) a worm comprising
      i. an axially rotatable shaft,
      ii. at least one land formed about the shaft and defining at least one hour-glass worm groove with a pitch lead angle equal to said acute angle and a depth and width sufficient to receive the individual spheres and cages,
      iii. at least one side wall of said groove formed with at least one track surface, said track surface having a variable diameter locus corresponding to an arcuate locus of a radius equal to that of said common circle said track surface engages the plurality of spheres carried by the wheel subassembly;
   (c) the wheel sub-assembly being disposed with its rotation axis at a right angle to that of the worm so that the plurality of spheres meshed within the groove in rolling engagement along the track surface without sliding engagement between the wheel and worm.

2. A worm gear drive according to claim 1 wherein the anti-friction means comprises ball-bearing means between each sphere and its associated cage so that the spheres mesh and roll in the groove without sliding engagement between the spheres and their cages.

3. A worm gear according to claim 2 wherein each ball-bearing means comprises
   (a) a pair of circular coaxial ball-bearing arrays revolvable in respective planes parallel to the wheel rotation axis and on opposite sides of the associated sphere center, and
   (b) inner and outer circular races for each ball-bearing array,
   (c) each inner race floating in closely spaced relation between the ball-bearing array and the sphere and each outer race being affixed to the cage,
   (d) whereby when the sphere rolls in the track it is forced back against the inner races to cause them to roll on the ball-bearing arrays.

4. A worm gear drive according to claim 1 wherein each cage defines opposed coaxial apertures through which opposed faces of the associated sphere project on a common axis, and opposite side walls of said groove define opposed sphere tracks, whereby the sphere rolls on one of said tracks and the drive is reversible.

5. A worm gear drive according to claim 1 wherein a single land is disposed on said shaft defining a single hour-glass worm groove.

6. In a worm gear which includes a unitary wheel subassembly having a peripheral array of equally spaced freely rotatable individual spheres and cages and sphere faces with respective centers thereof on a common circle, a worm comprising
   (a) an axially rotatable shaft, (b) at least one land formed about the shaft and defining at least one hour-glass worm groove with a pitch lead angle equal to an acute angle and a depth and width sufficient to receive the individual spheres and cages, (c) at least one side wall of said groove defining at least one track surface, said track surface having a variable diameter locus corresponding to an arcuate locus of a radius equal to that of said common circle said track surface engages the plurality of spheres carried by the wheel subassembly upon its rotational engagement with the worm groove of said rotatable shaft.

7. A worm gear drive according to claim 6 wherein a single land is disposed on said shaft defining a single hour-glass worm groove.

* * * * *